United States Patent
Beavon

[15] 3,642,448
[45] Feb. 15, 1972

[54] PROCESS FOR REMOVAL OF HYDROGEN SULFIDE FROM GAS STREAMS

[72] Inventor: David K. Beavon, Long Beach, Calif.
[73] Assignee: The Ralph M. Parsons Company, Los Angeles, Calif.
[22] Filed: Oct. 10, 1969
[21] Appl. No.: 865,464

[52] U.S. Cl. ...........................................23/255 R
[51] Int. Cl. .....................................C01b 17/04
[58] Field of Search ..............................23/224, 181

[56] References Cited

UNITED STATES PATENTS 2,997,439  8/1961  Nicklin et al.................23/181 X
3,516,793  6/1970  Renault.........................23/225

*Primary Examiner*—Oscar R. Vertiz
*Assistant Examiner*—G. O. Peters
*Attorney*—Christie, Parker & Hale

[57] ABSTRACT

Removal of oxygen from regenerative alkaline hydrogen sulfide absorption solutions before contacting the solution with a hydrogen sulfide containing process gas stream eliminates the formation of thiosulfate impurities.

8 Claims, 1 Drawing Figure

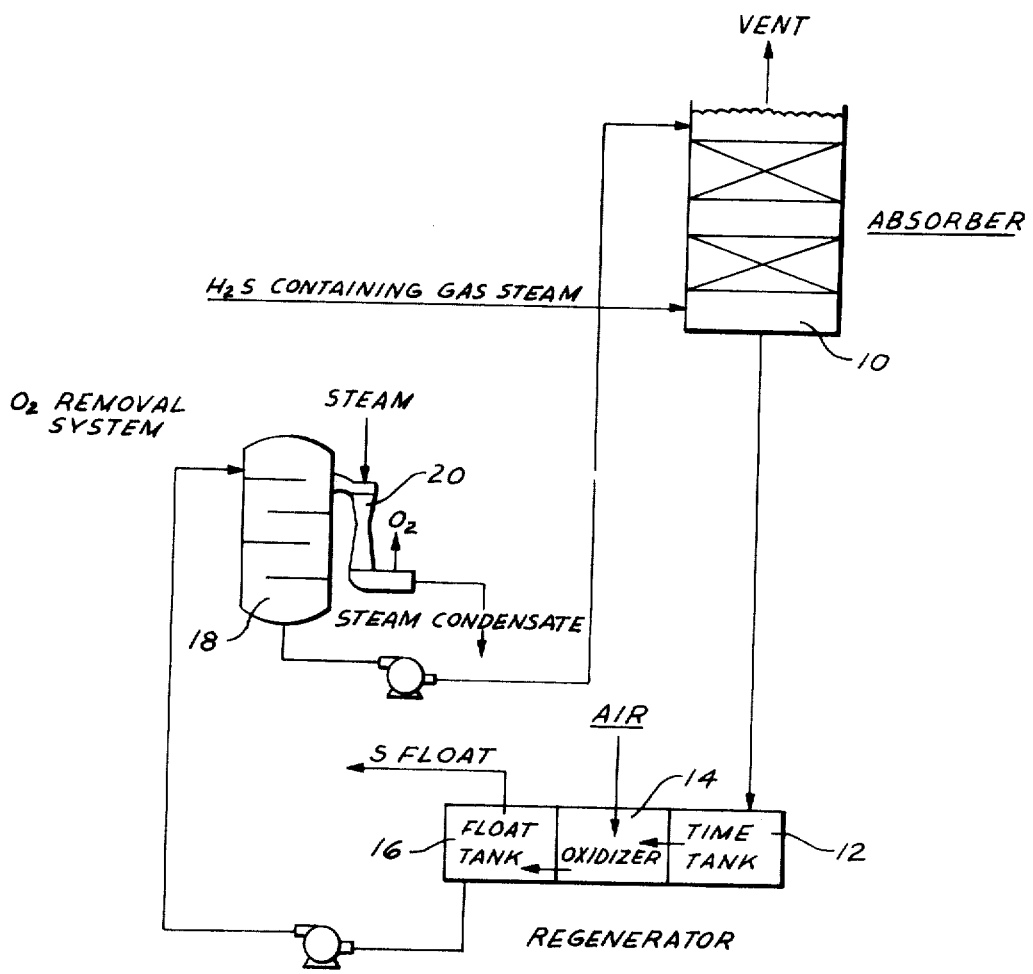

PROCESS FOR REMOVAL OF HYDROGEN SULFIDE FROM GAS STREAMS

BACKGROUND OF THE INVENTION

The present invention relates to improving absorption processes for extraction of hydrogen sulfide.

It is common in the sulfur industry to extract hydrogen sulfide from process gas streams by contacting the process gas stream with an alkaline absorption solution, typically containing a solution of sodium carbonate or potassium carbonate absorbent, to form alkali hydrosulfides. The formed compounds are oxidized with a contained oxidizing agent to yield elemental sulfur. The formed elemental sulfur is generally removed as a solid phase, usually by flotation and the reduced oxidizing agent regenerated by reoxidation, usually with air, to recondition the absorption solution for reuse.

Such sulfur recovery systems are theoretically fully regenerative and should be useful almost indefinitely. However, they lose their effectiveness with time and must be replaced.

SUMMARY OF THE INVENTION

It has now been found that in a cyclic regenerative alkali absorption process for recovery of sulfur from hydrogen sulfide-containing gas streams, in which hydrogen sulfide is absorbed and converted to an alkali hydrosulfide, then oxidized with a regenerative oxidizing agent to yield sulfur as a product and the reduced oxidizing agent is regenerated by contact with a source of oxygen to regenerate the absorption solution, effectiveness and longevity of the absorption solution can be substantially increased by removing residual oxygen from the regenerated absorption solution before further contact with a hydrogen sulfide-containing gas stream.

Removal of residual oxygen prevents the formation of alkali thiosulfate which is formed by reactions which compete with the desired alkali hydrosulfide reactions. The alkali thiosulfate is inert to the oxidizing agent and depletes the system of alkali ions. The removal of oxygen, according to this invention, reduces processing costs as much as 30 percent.

DRAWING

The attached drawing illustrates one system useful to carry out the practice of this invention.

DESCRIPTION

According to the present invention, removing entrained oxygen from a regenerated alkali hydrogen sulfide absorption solution before the regenerated absorption solution is brought into further contact with a hydrogen sulfide-containing process gas stream prevents the formation of sodium thiosulfate, which has been found to be a chief cause of depletion of the absorption solution activity.

With reference now to the drawing, hydrogen sulfide is typically removed from a process gas stream by passing the gas stream through absorber 10 before the gas stream is finally allowed to vent to the atmosphere or to subsequent processing use. The absorption solution typically used is an alkaline solution of sodium or potassium carbonate which also contains a regenerative oxidizing agent for alkali hydrosulfide. In the absorber hydrogen sulfide reacts with the alkali ions to form alkali hydrosulfide, which is then desirably oxidized by the oxidizing agent to yield solid sulfur and a salt of the oxidizing agent in the absorber 10 and time tank 12.

After reaction in time tank 12, the reduced oxidizing agent is regenerated by contact with a source of oxygen, usually air, in oxidizer 14. Solid sulfur is recovered by flotation in flotation tank 16 and, in accordance with the practice of this invention, the absorption solution is passed through a system for oxygen removal, which may be, as shown, the combined entrainment column 18 and steam ejecter 20, which cooperate to remove residual oxygen before the regenerated absorption solution is returned to absorber 10.

Although not limited thereto, the improvement afforded by the practice of this invention may be understood by a consideration of the operation of the Stretford, Ferrox and Ventrocoke regenerative absorption systems. These regenerative absorption systems respectively employ as oxidizers, salts of vanadic acid, such as sodium vanadate, iron compounds, such as ferric hydroxide, and salts of arsenic acid, such as sodium arsenate, and salts of anthraquinone disulfonic acid and the like, which generally undergo the following reactions when brought in contact with an alkali hydrosulfide, such as, for instance, sodium hydrosulfide:

STRETFORD

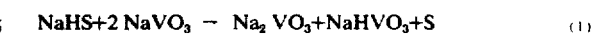
$$NaHS + 2\, NaVO_3 \rightarrow Na_2VO_3 + NaHVO_3 + S \quad (1)$$

FERROX

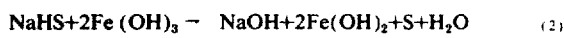
$$NaHS + 2Fe(OH)_3 \rightarrow NaOH + 2Fe(OH)_2 + S + H_2O \quad (2)$$

VETROCOKE

$$2NaHS + Na_3AsO_4 \rightarrow 2\,NaOH + S + Na_3AsSO_2 \quad (3)$$

The formed sulfur is normally recovered by flotation, using conventional flotation aids in float tank 16, and the reduced oxidizing agent regenerated by reaction with source of oxygen, as, for instance, provided by the addition of air to the oxidizer 14. Depending on the oxidizing agent used, the regenerative reactions are typically:

STRETFORD

$$2Na_2VO_3 + 2NaHVO_3 + O_2 \rightarrow 4\,NaVO_3 + 2NaOH \quad (4)$$

FERROX

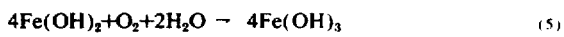
$$4Fe(OH)_2 + O_2 + 2H_2O \rightarrow 4Fe(OH)_3 \quad (5)$$

VETROCOKE $$Na_3AsSO_2 + O_2 \rightarrow Na_3AsO_4 + S$$

After regeneration and flotation to recover sulfur, the absorption system has been heretofore typically returned to the top of absorber 10. Unless rejuvenated by the addition of makeup chemicals, the absorption system soon loses its effectiveness with time and must be discarded. The cost of replacing the absorbent is significant and typically 30 percent or more of the cost of operating an absorption process for removal of hydrogen sulfide from a gas stream.

I have found that the cause of decay is a competing reaction which is uniformly present in all alkali based, regenerative absorption processes. This reaction is a conversion of hydrogen sulfide to thiosulfate by the reaction:

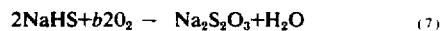
$$2NaHS + b2O_2 \rightarrow Na_2S_2O_3 + H_2O \quad (7)$$

The thiosulfate is inert with respect to the regenerative oxidizers in the absorption system and depletes the system of alkali ions. This requires purging or replacement with fresh chemicals.

As indicated, the formation of thiosulfate can be effectively eliminated, in accordance with the practice of this invention, by passing the regenerated absorption solution through an oxygen removal system to remove entrained oxygen before it is recontacted with the hydrogen sulfide-containing gas stream.

The oxygen removal system added to the absorption system is not narrowly critical and includes vacuum degassing systems, such as the steam-jet ejector system shown, countercurrent gas extraction using an oxygen-lean gas stream, such as a hydrocarbon gas stream as may be present in a processing plant, steam stripping and like gas extraction methods.

With reference to the drawing, a convenient oxygen removal system comprises a column 18 operated in conjunction with steam-jet ejector 20. The regenerated absorption solution conveniently enters column 18 at the top and is allowed to flow downward over a series of trays. A vacuum is drawn by passing steam at high pressure through steam-jet ejector 20. The vacuum extracts residual oxygen, nitrogen and other gases present, from the regenerated absorption solution. The gases are vented to the atmosphere and the steam condensed and discarded or returned for use. The regenerated absorption solution, when free of oxygen, is pumped from the bottom of column 18 to the top of an absorber 10 for further contact with the hydrogen sulfide-containing process gas stream.

Although removal of any amount of oxygen, according to the practice of this invention, is beneficial to operation of any absorption system, it is economically desirable to remove more than 50 percent and preferably more than 90 percent of the residual oxygen dissolved in the regenerated absorption solution before it is returned to absorber 10.

Oxygen may also, as indicated above, be conveniently removed by passing the absorption solution in concurrent or countercurrent contact with a gas stream which is oxygen lean in well known gas-liquid contact systems. Gas streams, such as hydrocarbon streams, which are oxygen lean, are typically present in a sulfur process plant and may be conveniently employed for the purpose of oxygen extraction.

What is claimed is:

1. In a cyclic regenerative alkali absorption process for recovery of sulfur from hydrogen sulfide-containing gas streams, which consists of the steps of absorbing and converting hydrogen sulfide to an alkali hydrosulfide, oxidizing the alkali hydrosulfide with a regenerative oxidizing agent to form elemental sulfur for recovery and regenerating the absorption solution by contacting the reduced oxidizing agent with a source of oxygen before recycling, the improvement which comprises removing residual dissolved oxygen from the regenerated absorption solution before further contact with a hydrogen sulfide-containing gas stream.

2. A process as claimed in claim 1 in which residual oxygen is removed from the regenerated absorption solution by vacuum extraction.

3. A process as claimed in claim 1 in which residual oxygen is removed from the regenerated absorption solution by passing the regenerated absorption solution in countercurrent contact with an oxygen lean gas.

4. A process as claimed in claim 1 in which residual oxygen is removed from the regenerated absorption solution by passing the regenerated absorption solution in concurrent contact with an oxygen lean gas.

5. A process as claimed in claim 1 in which the regenerative oxidizing agent in the absorption solution is selected from the group consisting of iron compounds and salts of vanadic acid, arsenic acid and anthraquinone disulfonic acid.

6. A process as claimed in claim 5 in which the salt of vanadic acid is sodium vanadate.

7. A process as claimed in claim 5 in which the salt of arsenic acid is sodium arsenate.

8. A process as claimed in claim 5 in which the iron compound is ferric hydroxide.

* * * * *

UNITED STATES PATENT OFFICE
CERTIFICATE OF CORRECTION

Patent No. 3,642,448　　　　　Dated　Feb. 15, 1972

Inventor(s)　David K. Beavon

It is certified that error appears in the above-identified patent and that said Letters Patent are hereby corrected as shown below:

At Column 2, between lines 50 and 55, reaction (7) should read as follows:

$$2NaHS + 2O_2 \longrightarrow Na_2S_2O_3 + H_2O$$

Signed and sealed this 18th day of July 1972.

(SEAL)
Attest:

EDWARD M. FLETCHER, JR.　　　ROBERT GOTTSCHALK
Attesting Officer　　　　　　Commissioner of Patents